(12) United States Patent
Wu et al.

(10) Patent No.: US 11,881,007 B2
(45) Date of Patent: Jan. 23, 2024

(54) VIDEO CROPPING METHOD AND APPARATUS, DEVICE, AND STORAGE MEDIUM

(71) Applicant: BEIJING BYTEDANCE NETWORK TECHNOLOGY CO., LTD., Beijing (CN)

(72) Inventors: Hao Wu, Beijing (CN); Yuntao Ma, Beijing (CN); Changhu Wang, Beijing (CN)

(73) Assignee: BEIJING BYTEDANCE NETWORK TECHNOLOGY CO., LTD.

( * ) Notice: Subject to any disclaimer, the term of this patent is extended or adjusted under 35 U.S.C. 154(b) by 0 days.

(21) Appl. No.: 18/001,067

(22) PCT Filed: Sep. 9, 2021

(86) PCT No.: PCT/CN2021/117458
§ 371 (c)(1),
(2) Date: Dec. 7, 2022

(87) PCT Pub. No.: WO2022/068551
PCT Pub. Date: Apr. 7, 2022

(65) Prior Publication Data
US 2023/0206591 A1 Jun. 29, 2023

(30) Foreign Application Priority Data
Sep. 30, 2020 (CN) .......................... 202011061772.8

(51) Int. Cl.
*G06V 10/46* (2022.01)
*G06V 30/148* (2022.01)
*G06V 40/16* (2022.01)
*G06V 10/10* (2022.01)
*G06V 10/34* (2022.01)
*G06T 5/00* (2006.01)

(52) U.S. Cl.
CPC ............ *G06V 10/462* (2022.01); *G06T 5/002* (2013.01); *G06V 10/16* (2022.01); *G06V 10/34* (2022.01);
(Continued)

(58) Field of Classification Search
CPC ...... G06V 10/462; G06V 10/16; G06V 10/34; G06V 30/153; G06V 40/161; G06V 20/41;
(Continued)

(56) References Cited

U.S. PATENT DOCUMENTS 10,929,979 B1 * 2/2021 Dimson ............... G06V 40/161
10,997,692 B2 * 5/2021 Zhang ................. G06F 18/2413
(Continued)

FOREIGN PATENT DOCUMENTS

CN 109640138 A 4/2019
CN 110189378 A 8/2019
(Continued)

OTHER PUBLICATIONS

Search Report dated Nov. 26, 2021 for PCT Application No. PCT/CN2021/117459 English Translation (7 pages).
(Continued)

*Primary Examiner* — Jose L Couso

(57) ABSTRACT

Provided are a video cropping method and apparatus, a device, and a storage medium. The method includes: obtaining at least one detection box of a first image frame; determining, based on at least one of an importance score, a coverage area, or a smoothing distance of any detection box in the at least one detection box, a cost of the detection box; determining a first detection box having a minimum cost among the at least one detection box as a cropping box; and cropping the first image frame based on the cropping box. Based on a cost of each detection box, the first detection box
(Continued)

having the minimum cost among the at least one detection box is determined as the cropping box to crop the first image frame, which can not only improve flexibility of video cropping, but also improve a cropping effect while simplifying the video cropping process.

13 Claims, 2 Drawing Sheets

(52) U.S. Cl.
CPC .......... *G06V 30/153* (2022.01); *G06V 40/161* (2022.01)

(58) Field of Classification Search
CPC ........ G06V 20/46; G06V 20/49; G06V 10/25; G06V 2201/07; G06V 20/40; G06T 5/002; G06T 7/20; G06T 7/73; G06T 2207/20132; G06T 7/11; G06T 7/292; G06T 7/38; G06T 7/33; G06T 2207/10016; G06T 2207/20221; G06T 2207/30232; H04N 21/44; H04N 21/44008; H04N 21/4402; H04N 21/440272; H04N 21/4726; H04N 5/232; H04N 7/18; G06K 9/4671
See application file for complete search history.

(56) References Cited

U.S. PATENT DOCUMENTS

| | | | | |
|---|---|---|---|---|
| 11,184,558 B1* | 11/2021 | Zhang | .................... | G06V 20/40 |
| 2013/0050574 A1* | 2/2013 | Lu | ......................... | G06V 20/47 |
| | | | | 348/E7.003 |
| 2013/0182134 A1 | 7/2013 | Grundmann et al. | | |
| 2014/0307112 A1 | 10/2014 | Sokeila et al. | | |
| 2016/0217328 A1* | 7/2016 | Yanai | ................... | G06V 10/993 |
| 2017/0358059 A1* | 12/2017 | Zhang | ................. | G11B 27/031 |
| 2019/0130189 A1* | 5/2019 | Zhou | .................. | G06V 10/7515 |
| 2020/0020071 A1* | 1/2020 | Frey | ..................... | G06F 3/04845 |
| 2020/0304754 A1 | 9/2020 | Huynh Thien et al. | | |
| 2021/0012502 A1* | 1/2021 | Mulford | .................... | G06T 7/11 |
| 2021/0056663 A1* | 2/2021 | Zhang | ................... | G06T 3/0012 |
| 2021/0185273 A1* | 6/2021 | Pitts | ........................ | G11B 27/34 |
| 2021/0287009 A1* | 9/2021 | Hu | ................... | H04N 21/44008 |
| 2022/0245756 A1* | 8/2022 | Mulford | .................. | G06T 11/20 |

FOREIGN PATENT DOCUMENTS

| | | |
|---|---|---|
| CN | 111356016 A | 6/2020 |
| CN | 111695540 A | 9/2020 |
| CN | 112188283 A | 1/2021 |
| WO | 2019112642 A1 | 6/2019 |

OTHER PUBLICATIONS

Grant Notice dated Oct. 9, 2022 in CN Application No. 202011061772. 8, English Translation (3 pages).
First Office Action dated Jan. 6, 2022 in CN Application No. 202011061772.8, English Translation (3 pages).
Second Office Action dated Jul. 1, 2022 in CN Application No. 202011061772.8, English Translation (9 pages).
Extended EP Search Report dated Nov. 22, 2023 in EP Appl. No. 21874212.0 (11 pages).
Khoenkaw et al., "Automatic pan-and-scan algorithm for heterogeneous displays," Multimed Tools Appl (2015) 74: 11837-11865, pp. 11837-11865 (29 pages).

* cited by examiner

VIDEO CROPPING METHOD AND APPARATUS, DEVICE, AND STORAGE MEDIUM

The present application claims priority to Chinese Patent Application No. 202011061772.8, titled "VIDEO CROPPING METHOD AND APPARATUS, DEVICE, AND STORAGE MEDIUM" filed with the China National Intellectual Property Administration on Sep. 30, 2020, the entire content of which is incorporated herein by reference.

FIELD

Embodiments of the present disclosure relate to the field of computer vision, and more particularly, to a video cropping method, a video cropping apparatus, a device, and a storage medium.

BACKGROUND

In general, an aspect ratio of an advertisement spot used for delivering an advertisement video is fixed, for example, 9:16. However, a size of a raw video is diverse. For example, different raw videos have different aspect ratios. Therefore, sizes of many raw videos are inconsistent with the size required by the advertisement spot. It is impossible to directly delivery other sizes of raw videos on the advertisement spot. Based on this, the raw video needs to be cropped to match the size of the advertisement spot.

Up to now, the raw video is usually cropped by center cropping.

However, due to randomness of a position of important information in the raw video, cropping the original video in center cropping manner may cause too less of the important information in the video to be reserved in the video, causing poor practicability and poor user experience.

SUMMARY

A video cropping method, a video cropping apparatus, a device, and a storage medium are provided, which can improve practicability and user experience while simplifying the video cropping process.

In a first aspect, a video cropping method is provided. The video cropping method includes: obtaining at least one detection box of a first image frame; determining, based on at least one of an importance score, a coverage area, or a smoothing distance of any detection box in the at least one detection box, a cost of the detection box, wherein the importance score is configured to characterize an importance degree of the detection box in the first image frame, the coverage area is configured to characterize an overlapping area between the detection box and a text box in the first image frame, and the smoothing distance is configured to characterize a distance between the detection box and a cropping box of a previous image frame of the first image frame; determining a first detection box having a minimum cost among the at least one detection box as a cropping box; and cropping the first image frame based on the cropping box.

In a second aspect, a video cropping apparatus is provided. The video cropping apparatus includes: an obtaining unit configured to obtain at least one detection box of a first image frame; a determination unit configured to determine, based on at least one of an importance score, a coverage area, or a smoothing distance of any detection box in the at least one detection box, a cost of the detection box, wherein the importance score is configured to characterize an importance of the detection box in the first image frame, the coverage area is configured to characterize an overlapping area of the detection box and a text box in the first image frame, and the smoothing distance is configured to characterize a distance between the detection box and a cropping box of a previous image frame of the first image frame, and determine a first detection box having a minimum cost among the at least one detection box as a cropping box; and a cropping unit configured to crop the first image frame based on the cropping box.

In a third aspect, an electronic device is provided. The electronic device includes a processor and a memory. The memory is configured to store a computer program. The processor is configured to invoke and run the computer program stored in the memory to perform the method in the first aspect.

In a fourth aspect, a computer-readable storage medium is provided. The computer-readable storage medium is configured to store a computer program. The computer program is configured to cause a computer to perform the method in the first aspect.

Based on the above solution, the first image frame is divided into the at least one detection box. Then the first detection box having the minimum cost among the at least one detection box is determined as the cropping box based on a cost of each detection box. On one hand, by dividing the first image frame into the at least one detection box, and determining the cropping box from the at least one detection box, not only video cropping can be realized, but also fixing of a position of the cropping box can be avoided, which can enhance flexibility of video cropping. On the other hand, by determining the cost of the detection box based on the importance score of the detection box, it is beneficial to avoid losing or cropping out important information in the first image frame to improve a cropping effect. Determining the cost of the detection box based on the coverage area of the detection box can avoid phenomena such as a partial text appearing in a cropped image to improve watching impression of the user and correspondingly improve the cropping effect. Determining the cost of the detection box based on the smoothing distance of the detection box can reduce movement amplitudes of positions of a plurality of cropped image frames in the video, to avoid frequent movement of the lens, and to improve the cropping effect. That is, the first detection box having the minimum cost among the at least one detection box is determined as the cropping box based on the cost of each detection box, to crop the first image frame, which can not only improve the flexibility of video cropping, but also improve the cropping effect.

In addition, since the detection box is directly determined as the cropping box, it is also beneficial to simplify video cropping process.

To sum up, based on the cost of each detection box, the first detection box having the minimum cost among the at least one detection box is determined as the cropping box to crop the first image frame, which can not only improve the flexibility of video cropping, but also improve the cropping effect while simplifying the video cropping process.

DETAILED DESCRIPTION

The solution provided embodiments of the present disclosure mainly relates to the field of Computer Vision (CV) technology.

The CV is a science of researching how to enable a machine to "watch". Further, it means the use of computer devices such as cameras and computers instead of human eyes to recognize, track and measure a target object in an image, as well as make further processing on the image, so that the processed image is more suitable for human eye observation or more convenient for transmission to other devices for detection. Theory and techniques related to CV studies attempt to establish an artificial intelligence system capable of obtaining information from images or multidimensional data. The CV technology may generally include technologies such as image processing, image recognition, image semantic interpretation, image retrieval, Optical Character Recognition (OCR), video processing, video semantic interpretation, video content/behavior recognition, three-dimensional object reconstruction, 3D technology, virtual reality, augmented reality, synchronous positioning and map construction, etc., and may also include common biometric recognition technologies such as face recognition and fingerprint recognition.

Figure 1:
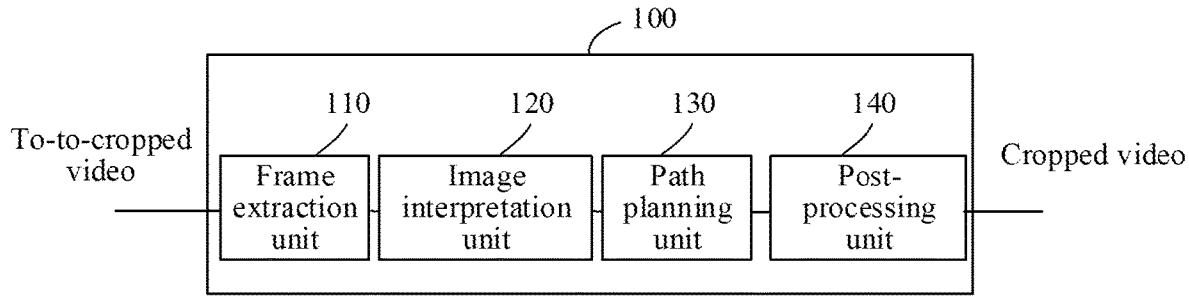
FIG. 1 is a schematic block diagram of a system framework according to an embodiment of the present disclosure.

FIG. 1 is a schematic block diagram of a system framework 100 according to an embodiment of the present disclosure.

As illustrated in FIG. 1, the system framework 100 may include a frame extraction unit 110, an image interpretation unit 120, a path planning unit 130, and a post-processing unit 140.

The frame extraction unit 110 is configured to receive a to-be-cropped video, and extract a to-be-processed image frame based on the to-be-cropped video.

The image interpretation unit 120 receives the to-be-processed image frame transmitted by the frame extraction unit 110, and processes the to-be-processed image frame.

For example, the image interpretation unit 120 may process the to-be-processed image frame through border detection, to remove useless borders such as black edges and Gaussian blur of the to-be-processed image frame. For another example, the image interpretation unit 120 may process the to-be-processed image frame through saliency detection to detect a position of a main component of the to-be-processed image frame, for example, for a saliency score of each pixel point in the to-be-processed image frame. For another example, the image interpretation unit 120 may process the to-be-processed image frame through face detection to detect a position at which a human face is located. For another example, the image interpretation unit 120 may process the to-be-processed image frame through text detection to detect a position at which a text is located and a content of the text. For another example, the image interpretation unit 120 may process the to-be-processed image frame through trademark (logo) detection to detect positions where trademark, watermark, and the like are located. After the processing, the image interpretation unit 120 may transmit a processed to-be-planned image frame and image information of the to-be-planned image frame to the path planning unit 130.

Of course, the image interpretation unit 120 may further have a preprocessing function. For example, border removal processing is performed on the to-be-processed image frame transmitted from the frame extraction unit 110.

The path planning unit 130 receives the to-be-planned image frame transmitted from the image interpretation unit 120, determines a planned path of the to-be-planned image frame based on the image information detected by the image processing unit 120, and then crops the to-be-planned image frame based on the planned path to output the cropped image frame.

The post-processing unit 140 may be configured to perform a post-processing operation on the cropped image frame. For example, interpolation processing or smoothing processing is performed. The interpolation processing may be understood as inserting a plurality of image frames between a plurality of cropped image frames through interpolation to generate a cropped video. For another example, positions of a plurality of cropped image frames in the video may be kept unchanged through the smoothing processing.

It should be noted that the system framework 100 may be a terminal or a server

The terminal may be devices such as a smart phone, a tablet computer, a portable computer, etc. An application that supports a video cropping technology is installed and runs in the terminal. The application may be a photography application, a video processing application, or the like. Exemplarily, the terminal is a terminal used by a user. A user account is logged in the application running in the terminal.

The terminal may be connected to the server through a wireless network or a wired network.

The server may be a cloud computing platform, a virtual center, or the like. The server is configured to provide a background service for the application that supports the video cropping technology. For example, the server undertakes a major video cropping work, and the terminal undertakes a minor video cropping work. For another example, the server undertakes the minor video cropping work, and the terminal undertakes the major video cropping work. For another example, the server or the terminal may undertake the video cropping work alone.

The server may include an access server, a video recognition server, and a database.

Figure 2:
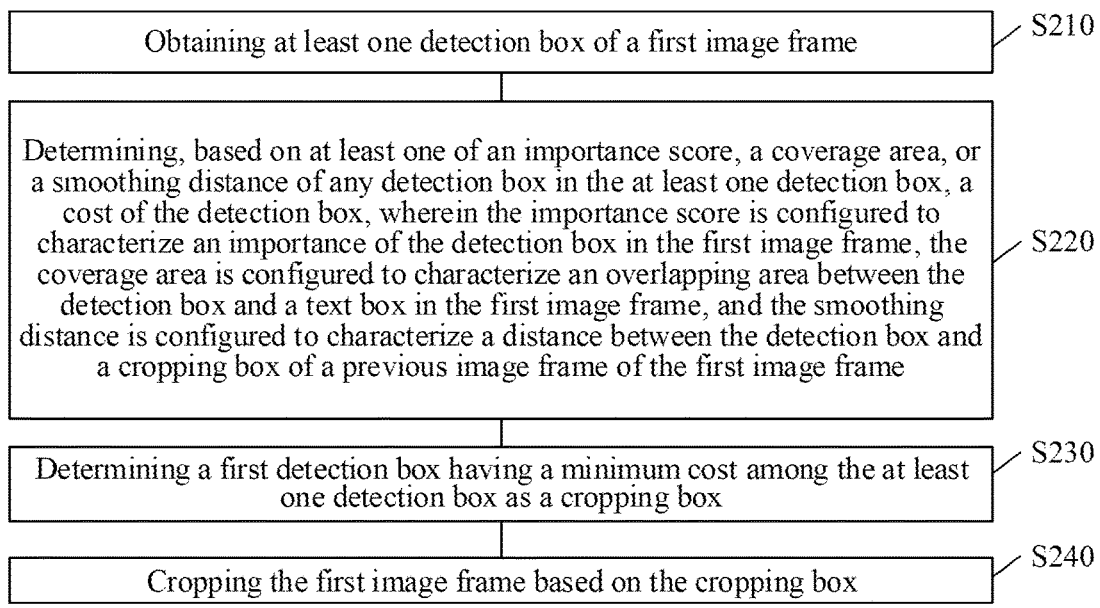
FIG. 2 is a schematic flowchart of a video cropping method according to an embodiment of the present disclosure.

FIG. 2 is a schematic flowchart of a video cropping method 200 according to an embodiment of the present disclosure. The method 200 may be applied to the terminal or the server. Both the terminal and the server may be considered as a computer device, for example, the system framework 100 illustrated in FIG. 1

As illustrated in FIG. 2, the method 200 may include blocks S210 to S240.

At S210, at least one detection box of a first image frame is obtained.

At S220, based on at least one of an importance score, a coverage area, or a smoothing distance of any detection box in the at least one detection box, a cost of the detection box is determined. The importance score is configured to characterize an importance of the detection box in the first image frame, the coverage area is configured to characterize an overlapping area between the detection box and a text box in the first image frame, and the smoothing distance is configured to characterize a distance between the detection box and a cropping box of a previous image frame of the first image frame.

At S230, a first detection box having a minimum cost among the at least one detection box is determined as a cropping box.

At S240, the first image frame is cropped based on the cropping box.

For example, the first image frame may be obtained by performing frame extraction processing on a to-be-cropped video. Therefore, the at least one detection box of the first image frame may be obtained to determine a first detection box in the at least one detection box. Based on this, the cost of the detection box is determined based on the at least one of the importance score, the coverage area, or the smoothing distance of any detection box in the at least one detection box, a first detection box having a minimum cost is then determined as the cropping box, and the first image frame is cropped based on the cropping box. Optionally, the at least one detection box may be preset. Of course, the at least one detection box may alternatively be set by the user, or may be generated based on image interpretation for the first image frame.

The first image frame is divided into the at least one detection box, and based on a cost of each detection box, the first detection box having the minimum cost among the at least one detection box is determined as the cropping box. On the one hand, by dividing the first image frame into the at least one detection box, and determining a cropping box from the at least one detection box, not only video cropping can be realized, but also fixing of a position of the cropping box is avoided, which enhances flexibility of video cropping. On the other hand, determining the cost of the detection box based on the importance score of the detection box is beneficial to avoid losing or cropping out important information in the first image frame, to improve a cropping effect. Determining the cost of the detection box based on the coverage area of the detection box can avoid phenomena such as a partial text appearing in a cropped image, to improve watching impression of the user and correspondingly improve the cropping effect. Determining the cost of the detection box based on the smoothing distance of the detection box can reduce movement amplitudes of the positions of the plurality of cropped image frames in the video, to avoid frequent movement of the lens, and further improve the cropping effect. Equivalently, by determining the first detection box having the minimum cost among the at least one detection box as the cropping box based on the cost of each detection box, to crop the first image frame, not only the flexibility of video cropping can be improved, but also the cropping effect can be improved.

In addition, by directly determining the detection box as the cropping box, it is beneficial to simplify the video cropping process.

To sum up, based on the cost of each detection box, the first detection box having the minimum cost among the at least one detection box is determined as the cropping box to crop the first image frame, which not only improves the flexibility of video cropping, but also improves the cropping effect, while simplifying the video cropping process.

It should be noted that specific realization of the at least one detection box is not limited in the present disclosure.

For example, the at least one detection box is a plurality of detection boxes, and detection boxes in the plurality of detection boxes may partially overlap. For another example, a size of the at least one detection box may be determined by taking a pixel as a granularity. For example, every twenty pixel points constitute one detection box. For another example, the size of the at least one detection box may be determined based on a size of the to-be-cropped video. For another example, the size of the at least one detection box may be determined based on a cropping size. The cropping size may be understood as an expected size of the cropped video, and may also be understood as an expected aspect ratio of the cropped video. The at least one detection box may be understood as at least one status or at least one cropping status. In other words, one status may be determined from the at least one status to crop the first image frame based on the one status.

Assuming that the size of the to-be-cropped video is 1280*720, the cropping size is 1:1, and a size of the cropped video is 720*720. Based on this, a size of each detection box in the at least one detection box may be 720*720.

In addition, the first image frame is not specifically limited in the present disclosure.

For example, the first image frame is an image frame which has been subjected to border removal or blurring processing. Certainly, the first image frame may alternatively be an image frame obtained by directly performing the frame extraction processing on a raw video.

In some embodiments of the present disclosure, S220 may include: determining an importance cost of the detection box based on the importance score of the detection box. The importance cost of the detection box decreases with an increase of the importance score of the detection box. The cost of the detection box includes the importance cost of the detection box.

Briefly, the cost of the detection box may be determined based on the importance score of the detection box.

By determining the cropping box from the at least one detection box based on the importance score of the at least one detection box, the cropping box may use or keep a position of important information in the first image frame. Accordingly, the important information in the first image frame may be prevented to be lost, to improve the watching impression for the cropped image.

In other words, the first detection box may be determined based on at least one importance score. The at least one importance score characterizes an importance of the at least one detection box in the first image frame, respectively.

For example, the at least one importance score is obtained through the saliency detection or face detection. For example, a maximum importance score is present among the at least one importance score, and a detection box corresponding to the maximum importance score is determined as the first detection box. The importance score of the detection box may be a sum of importance scores of all pixels in the detection box. An importance score of each pixel may include a saliency score obtained by the saliency detection and a face score obtained by the face detection.

In some embodiments of the present disclosure, at least one importance cost is determined only based on the first image frame.

For example, a first ratio of the detection box is determined. The first ratio is a ratio of the importance score of the detection box to an importance score of the first image frame. The importance cost of the detection box is determined based on the first ratio of the detection box. The importance cost of the detection box decreases with an increase of the first ratio of the detection box.

In other words, each detection box in the at least one detection box may correspond to one first ratio. For example, a first ratio of a same detection box in the at least one detection box is a ratio of an importance score of the same detection box to the importance score of the first image frame.

For another example, an importance cost corresponding to the same detection box may be determined by using the following equation:

$$S_{i1}=1-I(C_i)/I(C),$$

where $S_{i1}$ represents an importance cost corresponding to an i-th detection box in the at least one detection box, $C_i$ represents an i-th detection box in a C-th image frame, $I(C_i)$ represents an importance score of the detection box $C_i$, and $I(C)$ represents an importance score of the C-th image frame.

In some embodiments of the present disclosure, the at least one importance cost may be determined based on a second image frame.

For example, at least one ratio of the detection box is determined. The at least one ratio of the detection box includes a ratio of the importance score of the detection box to an importance score of each detection box in the previous image frame. The importance cost of the detection box is determined based on the at least one ratio of the detection box. The importance cost of the detection box decreases with an increase of a ratio in the at least one ratio.

In other words, each detection box in the at least one detection box may correspond to at least one ratio. For example, at least one ratio of a same detection box in the at least one detection box includes a ratio of the importance score of the same detection box to an importance score of each detection box in the second image frame. The second image frame is located before the first image frame in a time domain.

For another example, a total cost of each detection box may be determined by using the following equation:

$$S_{1i} = \sum_{j=1}^{1}(1 - I(C_i)/I(D_j)),$$

where $S_{i1}$ represents an importance cost corresponding to an i-th detection box in the at least one detection box, $C_i$ represents an i-th detection box in a C-th image frame, $I(C_i)$ represents an importance score of the detection box $C_i$, $D_j$ represents a j-th detection box in a D-th image frame, $I(D_j)$ represents an importance score of the detection box $D_j$, and n represents the number of detection boxes in the D-th image frame.

In some embodiments of the present disclosure, S220 may include: determining a coverage cost of the detection box based on the overlapping area between the detection box and the text box. The coverage cost corresponding to the detection box decreases first and then increases with an increase of the coverage area of the detection box. The cost of the detection box includes the coverage cost of the detection box.

Briefly, the cost of the detection box is determined based on an overlapping situation of the detection box with the text box in the first image frame.

By using the overlapping situation of the detection box with the text box, it is equivalent to determining the cropping box based on a consideration of the text box. Therefore, phenomena such as the partial text appearing in the cropped video may be avoided, to avoid lowering the watching impression of the user and to improve the cropping effect.

In other words, at least one coverage cost respectively corresponding to the at least one detection box may be determined based on an overlapping situation of the at least one detection box with the text box. A coverage cost corresponding to the same detection box in the at least one detection box decreases first and then increases with an increase of the coverage area. The coverage area is an overlapping area of the same detection box with the text box. The cropping box is determined based on the at least one coverage cost.

For another example, a coverage cost of each detection box may be determined by using the following equation:

$$S_{2i} = \lambda_1 \sum_{k=1}^{m} |B(C_i, T_K)|,$$

where $S_{2i}$ represents a coverage cost of an i-th detection box in the at least one detection box, $C_i$ represents an i-th detection box in a C-th image frame, $T_k$ represents a k-th text box in the C-th image frame, m represents the number of text boxes in the C-th image frame, $B(C_i, T_k)$ represents a coverage cost of the detection box $C_i$ and the text box, and $\lambda_1$ represents a coverage coefficient of the detection box $C_i$ and the text box $T_k$. For example, $\lambda_1$ is greater than or equal to 0 and smaller than 1.

For example, the at least one coverage cost may be determined by using the following equation:

$$x(1-x),$$

where X represents the overlapping area of the same detection box with the text box.

In some embodiments of the present disclosure, the text box includes a region where a text or a trademark is located in the first image.

For example, the text in the first image may be a subtitle of the first image frame.

In some embodiments of the present disclosure, S220 may include: determining a distance cost of the detection box based on a distance ratio of the detection box. The distance ratio of the detection box is a ratio of the smoothing distance of the detection box to a first length. The first length is a length of a side of the first image frame parallel to a first connection line. The first connection line is a connection line formed by the detection box and the cropping box of the previous image frame. The distance cost of the detection box increases with an increase of the distance ratio of the detection box. The cost of the detection box includes the distance cost of the detection box.

Briefly, the cost of the detection box may be determined based on the smoothing distance of the detection box.

The cropping box is determined based on a distance of the detection box relative to a cropping box of the second image frame. This is equivalent to that, in a process of determining the cropping box, movement amplitudes of positions of the plurality of cropped image frames in the video can be reduced as much as possible to avoid the frequent movement of the lens. Therefore, the cropping effect can be improved.

In other words, at least one distance cost respectively corresponding to the at least one detection box may be determined based on at least one distance ratio. Each of the at least one distance ratio is a ratio of a respective one of at least one smoothing distance to a length of a first side of the first image frame. Each of the at least one smoothing distance is a smoothing distance of a respective one of the at least one detection box. The first side is parallel to a distribution direction of the at least one detection box. A distance cost corresponding to a same detection box in the at least one detection box increases with an increase of a distance between the same detection box and the cropping box of the second image frame. The cropping box is determined based on the at least one distance cost.

For another example, a distance cost of each detection box may be determined by using the following equation:

$$S_{3i}=\lambda_2|(L(C_i)-L(D_t))/A|,$$

where $S_{3i}$ represents a distance cost of a i-th detection box in the at least one detection box, $C_i$ represents an i-th detection box in a C-th image frame, $\lambda_2$ represents a smoothing coefficient of the detection box $C_i$, relative to a detection box $D_j$, $L(C_i)$ represents a position of the detection box $C_i$, $D_t$ represents a cropping box of a D-th image frame. $L(D_t)$ represents a position of the cropping box of the D-th image frame, and A represents the length of the first side of the first image frame. For example, the first side is in an arrangement direction of the at least one detection box.

In some embodiments of the present disclosure, the method 200 may further include: performing smoothing or interpolation processing on a cropped image frame.

The preferred embodiments of the present disclosure are described in detail above with reference to the accompanying drawings. However, the present disclosure is not limited to specific details in the above embodiments. Many simple variants can be made to the technical solutions of the present disclosure within the scope of the technical concept of the present disclosure. These simple variants belong to the protection scope of the present disclosure. For example, the various specific technical features described in the above specific embodiments can be combined in any suitable manner without contradictions. In order to avoid unnecessary repetitions, various possible combinations will not be described separately in the present disclosure. For another example, different embodiments of the present disclosure can be combined arbitrarily, as long as the combination is within the idea of the present disclosure, and the combination should also be regarded as the content disclosed in the present disclosure.

For example, the first detection box may be determined based on a total cost corresponding to each detection box in the at least one detection box. The total cost may include at least one of the importance cost, the coverage cost, or the distance cost involved in the context.

For another example, the total cost of each detection box may be determined through the following equation:

$$S_i = \sum_{j=1}^{n}(1 - I(C_i)/I(D_j)) + \lambda_1 \sum_{k=1}^{m}|B(C_i, T_k)| + \lambda_2|(L(C_i) - L(D_j))/A|,$$

where $S_i$ represents a total cost of an i-th detection box in the at least one detection box, $C_i$ represents an i-th detection box in a C-th image frame. $I(C_i)$ represents an importance score of the detection box $C_i$, $D_j$ represents a j-th detection box in a D-th image frame, $I(D_j)$ represents an importance score of the detection box $D_j$, n represents the number of detection boxes of the D-th image frame, $T_k$ represents a k-th text box in the C-th image frame, m represents the number of text boxes in the C-th image frame, $B(C_i, T_k)$ represents a coverage cost of the detection box $C_i$, and the text box $T_k$, $\lambda_1$ represents a coverage coefficient of the detection box $C_i$, and the text box, $\lambda_2$ represents a smoothing coefficient of the detection box $C_i$, relative to the detection box $D_j$, $L(C_i)$ represents a position of the detection box $C_i$, $D_t$ represents a cropping box of the D-th image frame, and $L(D_t)$ represents a position of the cropping box of the D-th image frame.

Based on this, a detection box having a minimum total cost may be determined as the first detection box.

The method embodiments of the present disclosure are described in detail above with reference to FIG. 2, and apparatus embodiments of the present disclosure will be described in detail below in conjunction with FIG. 3 to FIG. 4.

Figure 3:
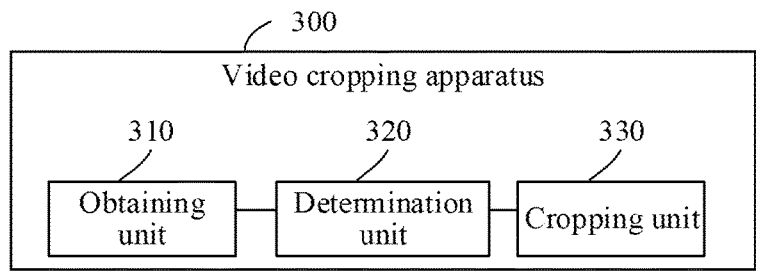
FIG. 3 is a schematic block diagram of a video cropping apparatus according to an embodiment of the present disclosure.

FIG. 3 is a schematic block diagram of a video cropping apparatus 300 according to an embodiment of the present disclosure.

The obtaining unit 310 is configured to obtain at least one detection box of the first image frame.

The determination unit 320 is configured to determine the first detection box from the at least one detection box.

The cropping unit 330 is configured to crop the first image frame by using the first detection box as a cropping box.

It is characterized in that the at least one detection box is preset.

In some embodiments of the present disclosure, the determination unit 320 is specifically configured to determine the first detection box based on the at least one importance score. Each of the at least one importance score characterizes an importance of a respective one of the at least one detection box in the first image frame.

In some embodiments of the present disclosure, the obtaining unit 310 is further configured to obtain the at least one importance score through saliency detection or face detection.

In some embodiments of the present disclosure, the determination unit 320 is specifically configured to: determine at least one importance cost respectively corresponding to the at least one detection box based on the at least one importance score, wherein an importance cost corresponding to a same detection box in the at least one detection box decreases with an increase of an importance score of the same detection box; and determine the first detection box based on the at least one importance cost.

In some embodiments of the present disclosure, the determination unit 320 is specifically configured to: determine a first ratio of each detection box in the at least one detection box, a first ratio of the same detection box in the at least one detection box being a ratio of the importance score of the same detection box to an importance score of the first image frame; and determine the importance cost corresponding to the same detection box based on the first ratio of the same detection box. The importance cost of the same detection box decreases with an increase of the first ratio of the same detection box.

In some embodiments of the present disclosure, the determination unit 320 is specifically configured to: determine at least one ratio of each detection box in the at least one detection box, the at least one ratio of the same detection box in the at least one detection box including a ratio of the importance score of the same detection box to an importance score of each detection box in a second image frame, the second image frame being located before the first image frame in a time domain; and determine the importance cost corresponding to the same detection box based on the at least one ratio of the same detection box. The importance cost of the same detection box decreases with an increase of a ratio of the at least one ratio.

In some embodiments of the present disclosure, the determination unit 320 is specifically configured to determine the first detection box based on an overlapping situation of the at least one detection box with a text box in the first image frame.

In some embodiments of the present disclosure, the determination unit 320 is specifically configured to: determine at least one coverage cost respectively corresponding to the at least one detection box based on the overlapping situation of the at least one detection box with the text box, wherein the coverage cost corresponding to the same detection box in the at least one detection box decreases first and then increases with an increase of a coverage area, and the coverage area is an overlapping area of the same detection box with the text box; and determine the first detection box based on the at least one coverage cost.

In some embodiments of the present disclosure, the text box includes a region where a text or a trademark is located in the first image.

In some embodiments of the present disclosure, the determination unit 320 is specifically configured to determine the first detection box based on a distance of each detection box in the at least one detection box relative to a second cropping box in the second image frame. The second image frame is located before the first image frame in the time domain.

In some embodiments of the present disclosure, the determination unit 320 is specifically configured to: determine at least one distance cost respectively corresponding to the at least one detection box based on at least one distance ratio, each of the at least one distance ratio being a ratio of a respective one of at least one distance to a length of a first side of the first image frame, each of the at least one distance being a distance of a respective one of the at least one detection box relative to the second cropping box, the first side being parallel to a distribution direction of the at least one detection box, and the distance cost corresponding to the same detection box in the at least one detection box increasing with an increase of a distance between the same detection box and the second cropping box; and determine the first detection box based on the at least one distance cost.

In some embodiments of the present disclosure, the first image frame is an image frame which has been subjected to border removal or blurring processing.

In some embodiments of the present disclosure, the cropping unit 330 is further configured to perform smoothing or interpolation processing on a cropped image frame.

It should be understood that the apparatus embodiments may correspond to the method embodiments, and reference may be made to the method embodiments for similar description of the apparatus embodiments. Details thereof will not be repeated here to avoid repetition. Specifically, the apparatus 300 illustrated in FIG. 3 may correspond to a corresponding subject that performs the method 200 according to the embodiments of the present disclosure, and the above and other operations and/or functions of modules in the apparatus 300 are respectively configured to perform corresponding processes of the method in FIG. 2. Details thereof will be omitted here for simplicity.

The apparatus and system according to the embodiments of the present disclosure are described above from the perspective of functional modules in conjunction with the accompanying drawings. It should be understood that the functional modules can be implemented in a form of hardware, instructions in a form of software, or a combination of hardware and software modules. Specifically, steps of the method embodiments in the embodiments of the present disclosure can be completed by hardware integrated logic circuits in a processor and/or instructions in the form of software. The steps of the method that are disclosed in combination with the embodiments of the present disclosure can be directly embodied as being executed by a hardware decoding processor, or executed by a combination of hardware and software modules in the decoding processor. Optionally, the software module may be located in a mature storage medium in the field such as a random access memory, a flash memory, a Read-Only Memory (ROM), a Programmable ROM (PROM), an electrically erasable programmable memory, a register, etc. The storage medium is located in the memory, and the processor reads information from the memory, and completes the steps in the above method embodiments in combination with hardware thereof.

Figure 4:
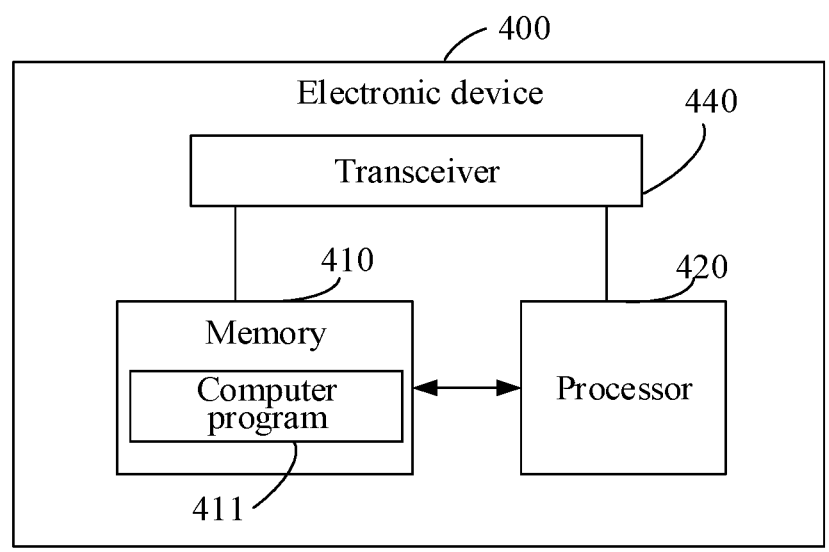
FIG. 4 is a schematic block diagram of an electronic device according to an embodiment of the present disclosure.

FIG. 4 is a schematic block diagram of an electronic device 400 according to an embodiment of the present disclosure.

As illustrated in FIG. 4, the electronic device 400 may include a memory 410 and a processor 420. The memory 410 is configured to store a computer program 411 and transmit the computer program 411 to the processor 420. In other words, the processor 420 may invoke and run the computer program 411 from the memory 410 to implement the method according to the embodiments of the present disclosure.

For example, the processor 420 may be configured to execute procedures in the method 200 according to instructions in the computer program 411.

In some embodiments of the present disclosure, the processor 420 may include but is not limited to a general-purpose processor, a Digital Signal Processor (DSP), an Application Specific Integrated Circuit (ASIC), a Field Programmable Gate Array (FPGA) or other programmable logic devices, a discrete gate or a transistor logic device, a discrete hardware component, etc.

In some embodiments of the present disclosure, the memory 410 includes but is not limited to a volatile memory and/or a non-volatile memory.

Here, the non-volatile memory can be a Read-Only Memory (ROM), a Programmable ROM (PROM), an Erasable PROM (EPROM), an Electrically EPROM (EEPROM), or a flash memory. The volatile memory may be a Random Access Memory (RAM) used as an external cache. Exemplarily but without limitation, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a synch link DRAM (SLDRAM), and a Direct Rambus RAM (DR RAM).

In some embodiments of the present disclosure, the computer program 411 may be divided into one or more modules that are stored in the memory 410 and executed by the processor 420, to implement the video cropping method provided by the present disclosure. The one or more modules may be a series of computer program instruction segments capable of completing specific functions, and the instruction segments are used to describe a process of the execution of the computer program in the electronic device 400.

As illustrated in FIG. 4, the electronic device 400 may further include a transceiver 440 that may be connected to the processor 420 or the memory 410.

Here, the processor 420 may control the transceiver 440 to communicate with other devices, specifically, to transmit information or data to other devices, or receive information or data transmitted from other devices. The transceiver 440 may include a transmitter and a receiver. The transceiver 440 may further include one or more antennas.

It should be understood that various components in the electronic device 400 are connected via a bus system. In addition to a data bus, the bus system also includes a power bus, a control bus, and a status signal bus.

The present disclosure further provides a computer storage medium. The computer storage medium has a computer program stored thereon. The computer program, when executed by a computer, causes the computer to perform the method according to the above method embodiments. In other words, the embodiments of the present disclosure further provide a computer program product including instructions. The instructions, when executed by a computer, cause the computer to perform the method according to the above method embodiments.

When implemented by software, implementation can be made in the form of a computer program product completely or in part. The computer program product includes one or more computer instructions. The one or more computer program instructions, when loaded and executed on a computer, produce all or a part of the processes or functions described in the embodiments of the present disclosure. The computer may be a general purpose computer, an application specific computer, a computer network, or any other programmable device. The computer instructions may be stored in a computer-readable storage medium or transmitted from one computer-readable storage medium to another computer-readable storage medium. For example, the one or more computer instructions may be transmitted from one website, computer, server, or data center to another website, computer, server, or data center in a wired manner (such as coaxial cable, optical fiber, digital subscriber line (DSL)) or a wireless manner (such as infrared, wireless, microwave, etc.). The computer-readable storage medium may be any usable medium that can be accessed by a computer or a data storage device such as a server or a data center integrated with one or more usable mediums. The usable medium may be a magnetic medium (for example, a floppy disk, a hard disk, a magnetic tape), an optical medium (for example, a digital video disc (DVD)), or a semiconductor medium (for example, a solid state disk (SSD)), etc.

It can be appreciated by those skilled in the art that the modules and the steps of the algorithm of examples described in combination with the embodiments disclosed herein may be implemented in electronic hardware or a combination of computer software and electronic hardware. These functions can be realized by hardware or software, depending on specific applications and design constraint conditions of the technical solution. For each specific application, the person skilled in the art can use different methods to implement the described functions, but such implementation should not be considered as going beyond the scope of the present disclosure.

It is to be understood that the systems, apparatuses, and methods disclosed in several embodiments provided by the present disclosure can be implemented in other ways. For example, the apparatus embodiments described above are merely exemplary. For example, the modules are merely divided based on logic functions. In practical implementation, the modules can be divided in other manners. For example, multiple modules or components can be combined or integrated into another system, or some features can be omitted or not executed. In addition, mutual coupling or direct coupling or communication connection described or discussed can be implemented through some interfaces, and indirect coupling or communication connection of apparatuses or modules may be electrical, mechanical or in other forms.

The modules illustrated as separate components may be or may not be separated physically, and components shown as modules may be or may not be physical modules, i.e., may be located at one position, or distributed onto multiple network units. It is possible to select some or all of the modules according to actual needs, for achieving the solution of the embodiment of the present disclosure. For example, respective functional modules in respective embodiments of the present disclosure can be integrated into one processing module, or be present separately and physically. It is also possible to integrate two or more modules into one module.

The above description merely illustrates specific implementations of the present disclosure, and the scope of the present disclosure is not limited thereto. Any change or replacement easily envisaged by those skilled in the art within the technical scope disclosed by the present disclosure should fall into the protection scope of the present disclosure. The protection scope of the present disclosure is defined only by the claims.

What is claimed is:

1. A video cropping method, comprising:
obtaining at least one detection box of a first image frame, wherein each of the least one detection box has a size identical to a cropping size of the first image frame;
determining, based on an importance score, a coverage area, and a smoothing distance of any detection box in the at least one detection box, a cost of the detection box, wherein:
the importance score is configured to characterize an importance of the detection box in the first image frame,
the coverage area is configured to characterize an overlapping area between the detection box and a text box in the first image frame, and
the smoothing distance is configured to characterize a distance between the detection box and a cropping box of a previous image frame of the first image frame;
determining a first detection box having a minimum cost among the at least one detection box as a cropping box; and
cropping the first image frame based on the cropping box, wherein the method further comprises:
obtaining the importance score of the detection box through saliency detection and/or face detection,
wherein said determining, based on the importance score, the coverage area, and the smoothing distance of any detection box in the at least one detection box, the cost of the detection box comprises:
determining an importance cost of the detection box based on the importance score of the detection box,
wherein the importance cost of the detection box decreases with an increase of the importance score of the detection box, and
wherein the cost of the detection box comprises the importance cost of the detection box,
wherein said determining the importance cost of the detection box based on the importance score of the detection box comprises:
determining a first ratio of the detection box, the first ratio being a ratio of the importance score of the detection box to an importance score of the first image frame; and
determining the importance cost of the detection box based on the first ratio of the detection box, the importance cost of the detection box decreasing with an increase of the first ratio of the detection box, or
said determining the importance cost of the detection box based on the importance score of the detection box comprises:

determining at least one ratio of the detection box, the at least one ratio of the detection box comprising a ratio of the importance score of the detection box to an importance score of each detection box in the previous image frame; and determining the importance cost of the detection box based on the at least one ratio of the detection box, the importance cost of the detection box decreasing with an increase of a ratio in the at least one ratio.

2. The method according to claim 1, wherein said determining, based on the importance score, the coverage area, and the smoothing distance of any detection box in the at least one detection box, the cost of the detection box comprises:

determining a coverage cost of the detection box based on the overlapping area between the detection box and the text box, wherein:

the coverage cost corresponding to the detection box decreases first and then increases with an increase of the coverage area of the detection box, and the cost of the detection box comprises the coverage cost of the detection box.

3. The method according to claim 2, wherein the text box comprises a region where a text or a trademark is located in the first image frame.

4. The method according to claim 1, wherein said determining, based on the importance score, the coverage area, and the smoothing distance of any detection box in the at least one detection box, the cost of the detection box comprises:

determining a distance cost of the detection box based on a distance ratio of the detection box, wherein:

the distance ratio of the detection box is a ratio of the smoothing distance of the detection box to a first length, the first length being a length of a side of the first image frame parallel to a first connection line, the first connection line being a connection line formed by the detection box and the cropping box of the previous image frame, the distance cost of the detection box increases with an increase of the distance ratio of the detection box, and the cost of the detection box comprises the distance cost of the detection box.

5. The method according to claim 1, wherein the first image frame is an image frame which has been subjected to border removal or blurring processing.

6. The method according to claim 1, further comprising:
performing smoothing or interpolation processing on a cropped image frame.

7. An electronic device, comprising:
a memory configured to store a computer program; and
a processor configured to invoke and run the computer program stored in the memory to perform the method according to claim 1.

8. A non-transitory computer-readable storage medium configured to store a computer program, wherein the computer program is configured to cause a computer to perform the method according to claim 1.

9. The electronic device according to claim 7, wherein said determining, based on the importance score, the coverage area, and the smoothing distance of any detection box in the at least one detection box, the cost of the detection box comprises:

determining a coverage cost of the detection box based on the overlapping area between the detection box and the text box, wherein:

the coverage cost corresponding to the detection box decreases first and then increases with an increase of the coverage area of the detection box, and the cost of the detection box comprises the coverage cost of the detection box.

10. The electronic device according to claim 9, wherein the text box comprises a region where a text or a trademark is located in the first image frame.

11. The electronic device according to claim 7, wherein said determining, based on the importance score, the coverage area, and the smoothing distance of any detection box in the at least one detection box, the cost of the detection box comprises:

determining a distance cost of the detection box based on a distance ratio of the detection box, wherein:

the distance ratio of the detection box is a ratio of the smoothing distance of the detection box to a first length, the first length being a length of a side of the first image frame parallel to a first connection line, the first connection line being a connection line formed by the detection box and the cropping box of the previous image frame, the distance cost of the detection box increases with an increase of the distance ratio of the detection box, and the cost of the detection box comprises the distance cost of the detection box.

12. The electronic device according to claim 7, wherein the first image frame is an image frame which has been subjected to border removal or blurring processing.

13. The electronic device according to claim 7, wherein the method further comprises:

performing smoothing or interpolation processing on a cropped image frame.

* * * * *